US012650934B2

(12) United States Patent
Kashyap

(10) Patent No.: US 12,650,934 B2
(45) Date of Patent: Jun. 9, 2026

(54) LOW-LATENCY BRIDGE TO SUPPORT OUT-OF-ORDER EXECUTION

(71) Applicant: Google LLC, Mountain View, CA (US)

(72) Inventor: Raj Shekhar Kashyap, Bengaluru (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/577,636

(22) PCT Filed: Jul. 19, 2021

(86) PCT No.: PCT/US2021/042186
§ 371 (c)(1),
(2) Date: Jan. 8, 2024

(87) PCT Pub. No.: WO2023/003533
PCT Pub. Date: Jan. 26, 2023

(65) Prior Publication Data
US 2024/0320166 A1 Sep. 26, 2024

(51) Int. Cl.
*G06F 13/16* (2006.01)

(52) U.S. Cl.
CPC ...... *G06F 13/1626* (2013.01); *G06F 13/1663* (2013.01); *G06F 13/1673* (2013.01)

(58) Field of Classification Search
CPC ............. G06F 13/1626; G06F 13/1663; G06F 13/1673
See application file for complete search history.

(56) References Cited

U.S. PATENT DOCUMENTS

| | | | |
|---|---|---|---|
| 6,260,091 B1 | 7/2001 | Jayakumar et al. | |
| 7,096,345 B1 | 8/2006 | Chen et al. | |
| 7,124,231 B1 | 10/2006 | Garner et al. | |
| 7,788,470 B1 | 8/2010 | Purcell et al. | |
| 8,656,117 B1 * | 2/2014 | Wong ................... | G06F 9/3824 |
| | | | 710/56 |
| 9,348,775 B2 | 5/2016 | Jandhyam | |

(Continued)

FOREIGN PATENT DOCUMENTS

WO 2023003533 1/2023

OTHER PUBLICATIONS

"International Preliminary Report on Patentability", Application No. PCT/US2021/042186, Jan. 18, 2024, 10 pages.

(Continued)

*Primary Examiner* — Tracy A Warren
(74) *Attorney, Agent, or Firm* — Colby Nipper PLLC

(57) ABSTRACT
This document describes systems and techniques for a low-latency bridge to support out-of-order execution. The described systems and techniques can facilitate out-of-order execution by a memory controller of in-order transaction requests. When it receives transaction responses associated with in-order transaction requests, the bridge can send a first transaction response without storing it in a reorder buffer. Similarly, the bridge can determine whether a next transaction response is available to send to the respective client. The bridge introduces latency to a larger system (e.g., an SoC) only when a secondary response (e.g., not first) of in-order transaction responses is received first. In this way, the memory controller can process transaction requests from one or more clients with minimal latency introduced by the bridge and a smaller reorder buffer.

20 Claims, 9 Drawing Sheets

300 —➘

(56) References Cited

U.S. PATENT DOCUMENTS

| | | | |
|---|---|---|---|
| 11,899,969 | B1 * | 2/2024 | Singer .................... G06F 3/0656 |
| 2002/0083247 | A1 * | 6/2002 | Shah .................... G06F 13/1626 |
| | | | 710/112 |
| 2002/0091913 | A1 * | 7/2002 | Fukagawa ............. G06F 9/3856 |
| | | | 712/225 |
| 2016/0179718 | A1 * | 6/2016 | Morris .................... G06F 13/28 |
| | | | 710/308 |
| 2016/0188501 | A1 * | 6/2016 | Chan .................... G06F 13/4068 |
| | | | 710/113 |
| 2018/0285145 | A1 * | 10/2018 | Acharya ............. G06F 13/1673 |
| 2019/0004878 | A1 | 1/2019 | Adler et al. |
| 2019/0188164 | A1 * | 6/2019 | Avrukin .............. G06F 13/1673 |
| 2019/0220423 | A1 * | 7/2019 | Makwana ............. G06F 13/364 |
| 2019/0227716 | A1 * | 7/2019 | Teh ........................ G06F 3/0611 |
| 2020/0293233 | A1 * | 9/2020 | Waugh ................ G06F 12/0837 |
| 2020/0401440 | A1 | 12/2020 | Sankaran |

OTHER PUBLICATIONS

"International Search Report and Written Opinion", Application No. PCT/US2021/042186, Apr. 11, 2022, 13 pages.
"Little's la—Wikipedia", Retrieved at: https://en.wikipedia.org/wiki/ Little%27s_law, 6 pages.
"Out-of-order execution—Wikipedia", Retrieved at: https://en. wikipedia.org/wiki/Out-of-order_execution—on May 3, 2021, 7 pages.
"Zynq-7000 SoC Technical Reference Manual", UG585 (v1.12.2), Jul. 1, 2018, 1825 pages.

* cited by examiner

100 —

User Device
102

RF Transceiver(s)
104

SOC
106

Clients
108

Memory Subsystem
110

RAM
112

Memory Controller
114

Bridge
116

Reorder Buffer
118

CRM
120

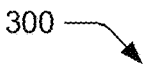
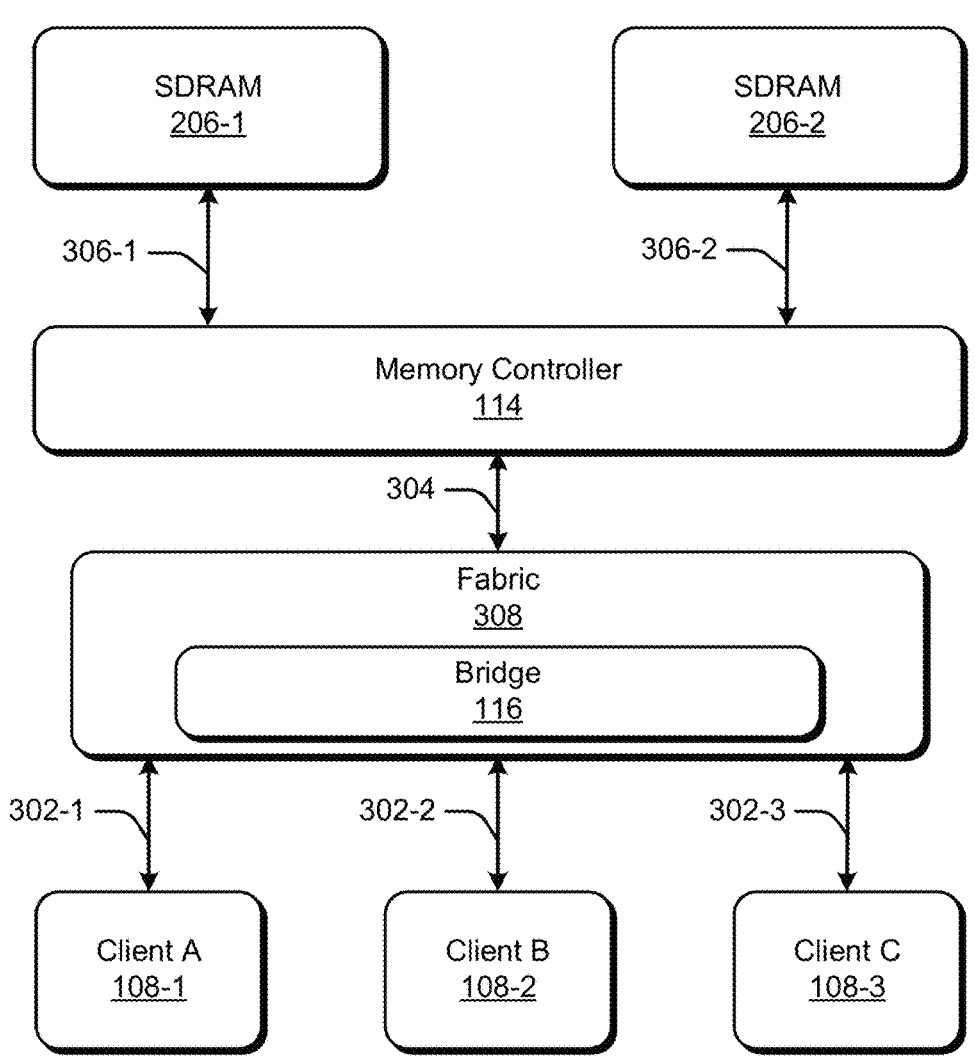
*FIG. 3*

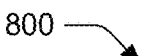
800

Receive multiple transaction requests
from a first client of one or more clients
802

Receive multiple transaction responses from a memory controller,
each transaction response associated with a corresponding transaction
request and to be returned by a bridge in-order to the first client
804

Responsive to a first transaction response being received, send
data associated with the first transaction response to the first client
and bypass storing the data in a reorder buffer of the bridge
806

FIG. 8

LOW-LATENCY BRIDGE TO SUPPORT OUT-OF-ORDER EXECUTION

RELATED APPLICATION(S)

This application is a national stage entry of International Application No. PCT/US2021/042186, filed Jul. 19, 2021, the disclosure of which is incorporated herein by reference in its entirety.

BACKGROUND

Processors, such as central processing units (CPUs) and systems on chip (SoCs), can operate with out-of-order execution (sometimes referred to as dynamic execution) to utilize otherwise wasted instruction cycles. Out-of-order execution results in a processor executing instructions in an order governed by the availability of input data and execution units rather than by their original order in a program. Out-of-order execution can increase the amount of parallel processing and improve processor throughput. Out-of-order execution, however, is not always possible because some clients (sometimes referred to as initiators or masters) issue in-order transaction requests or commands. Some processors use a bridge between clients and the memory system to accept in-order requests but support out-of-order execution towards the memory system. Such bridges generally add latency during the in-order to out-of-order conversion, resulting in reduced processor throughput.

SUMMARY

This document describes systems and techniques for a low-latency bridge to support out-of-order execution. The described systems and techniques can facilitate out-of-order execution by a memory controller of in-order transaction requests. When it receives transaction responses associated with in-order transaction requests, the bridge can send a first transaction response without storing it in a reorder buffer. Similarly, the bridge can determine whether a next transaction response is available to send to the respective client. The bridge introduces latency to a larger system (e.g., an SoC) only when a secondary response (e.g., not first) of in-order transaction responses is received first. In this way, the memory controller can process transaction requests from one or more clients with minimal latency introduced by the bridge and a smaller reorder buffer.

For example, an apparatus includes a bridge and a memory controller. The memory controller is operatively connected to one or more memories (e.g., random access memories (RAMs)). The memory controller can process transaction requests from one or more clients to access data in the memories. The bridge is operatively connected to the memory controller and the clients. The bridge includes a reorder buffer and can receive transaction requests from a first client. The bridge can also receive transaction responses from the memory controller to return in-order to the first client. Each transaction response is associated with a corresponding transaction request. Responsive to receiving a first transaction response, the bridge can send data associated with the first transaction response to the first client and bypass storing the data in the reorder buffer.

As another example, a method includes receiving, by a bridge, multiple transaction requests from a first client of one or more clients. The bridge is operatively connected to the clients and includes a reorder buffer. The method also includes receiving, by the bridge, multiple transaction responses from a memory controller. Each transaction response is associated with a corresponding transaction request. The bridge can return the multiple transaction responses in-order to the first client. The memory controller is operatively connected to one or more memories and can process transaction requests from the clients to access data in the memories. The method further includes, responsive to a first transaction response of the multiple transaction responses being received, sending data associated with the first transaction response to the first client and bypass storing the data in the reorder buffer.

This document also describes other methods, configurations, and systems for a low-latency bridge to support out-of-order execution.

This Summary introduces simplified concepts for a low-latency bridge to support out-of-order execution, which is further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a low-latency bridge to support out-of-order execution are described in this document with reference to the following drawings. The same numbers are used throughout multiple drawings to reference like features and components.

FIG. 1 illustrates an example device diagram of a user device in which systems and techniques for a low-latency bridge to support out-of-order execution can be implemented.

FIG. 3 illustrates an example diagram of a memory subsystem with a low-latency bridge to support out-of-order execution.

FIGS. 5-1 and 5-2 illustrate example data associated with a transaction request and a transaction response for a low-latency bridge to support out-of-order execution.

FIG. 8 is a flowchart illustrating example operations of a low-latency bridge to support out-of-order execution.

DETAILED DESCRIPTION

Overview

Figure 2:
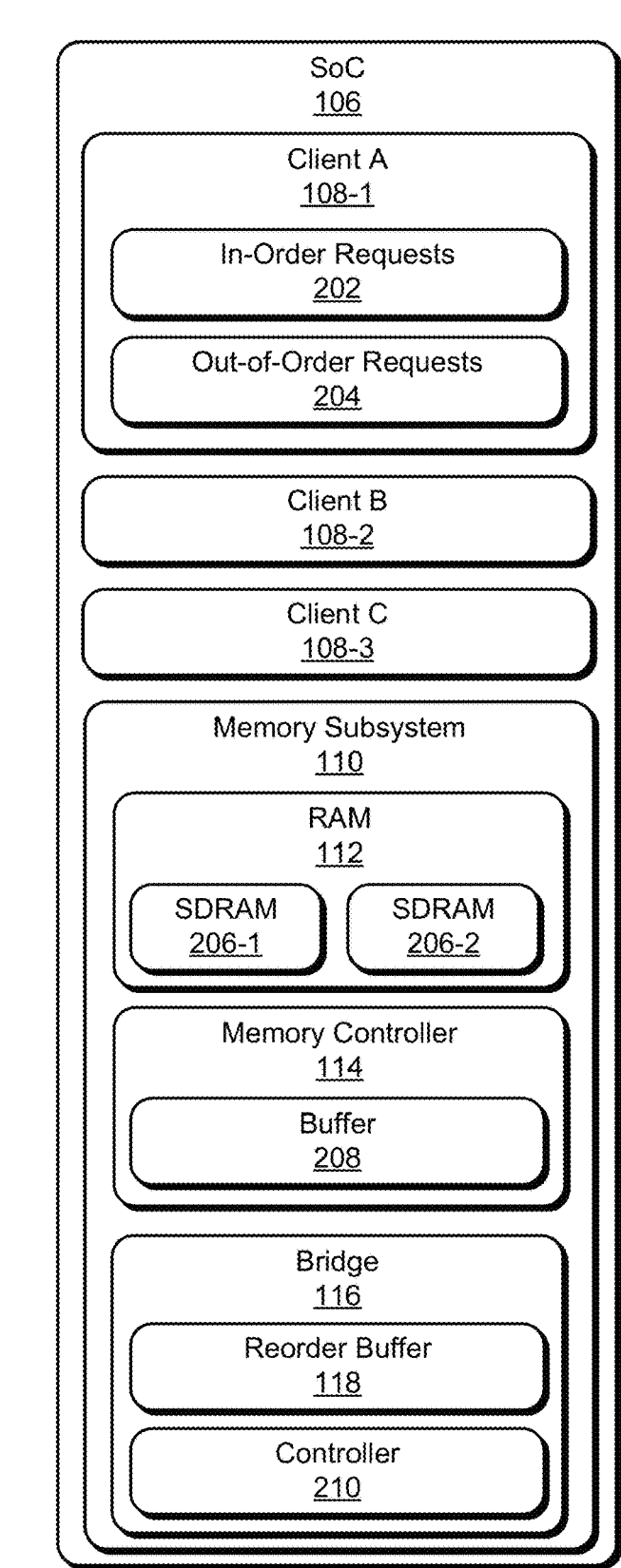
FIG. 2 illustrates an example device diagram of an SoC in which systems and techniques for a low-latency bridge to support out-of-order execution can be implemented.

This document describes systems and techniques for a low-latency bridge to support out-of-order execution. Processors can issue transaction requests to memory systems in-order or out-of-order. Processors utilize out-of-order execution to avoid wasted instruction cycles and reduced processor throughput. However, as explained above, out-of-order execution may not be possible because some clients issue in-order transaction requests and are not equipped to handle out-of-order transaction responses. Therefore, some processors can use a bridge between clients and the memory subsystem to accept in-order requests but support out-of-order execution by the memory subsystem.

Some bridges add latency during the in-order to out-of-order processing. These and other bridges require a reorder buffer that is relatively large. For example, engineers generally size the reorder buffer to store the maximum number of possible outstanding transaction requests.

In contrast, the described systems and techniques for a low-latency bridge support the out-of-order execution of in-order transaction requests with minimal, or at least reduced, latency. When it receives transaction responses associated with in-order transaction requests, the bridge can send a first transaction response without storing it in a reorder buffer. Similarly, the bridge can determine whether a next transaction response is available to send to the respective client. The described low-latency bridge adds minimal latency to the processor throughput because latency is generally only added when a secondary response to an in-order transaction request is received before the primary response. The bridge can also process transaction requests from clients using a relatively small reorder buffer by sending transaction responses corresponding to a head (or head pointer) of a linked list to the respective client without buffering the data for a head element.

As a non-limiting example, an apparatus or a memory subsystem includes a memory controller and a bridge. The memory controller is operatively connected to one or more memories (e.g., RAMs) and the bridge. The bridge is operatively connected to one or more clients. The memory controller can process transaction requests from the clients to access data in the memories. The bridge can receive transaction requests, including transaction requests to be returned in-order, from a first client. The bridge can also receive from the memory controller transaction responses associated with corresponding transaction requests. The transaction responses are to be returned by the bridge in-order to the first client. Responsive to receiving a first transaction response, the bridge can send data associated with the first transaction response to the first client and bypass storing the data in the reorder buffer.

This example is just one illustration of a low-latency bridge to support out-of-order execution to improve the throughput of a processor or to reduce resource requirements of the bridge. Other example configurations and methods are described throughout this document. This document describes additional example methods, configurations, and components for the described low-latency bridge to support out-of-order execution.

Example Devices

Figures 1, 5:
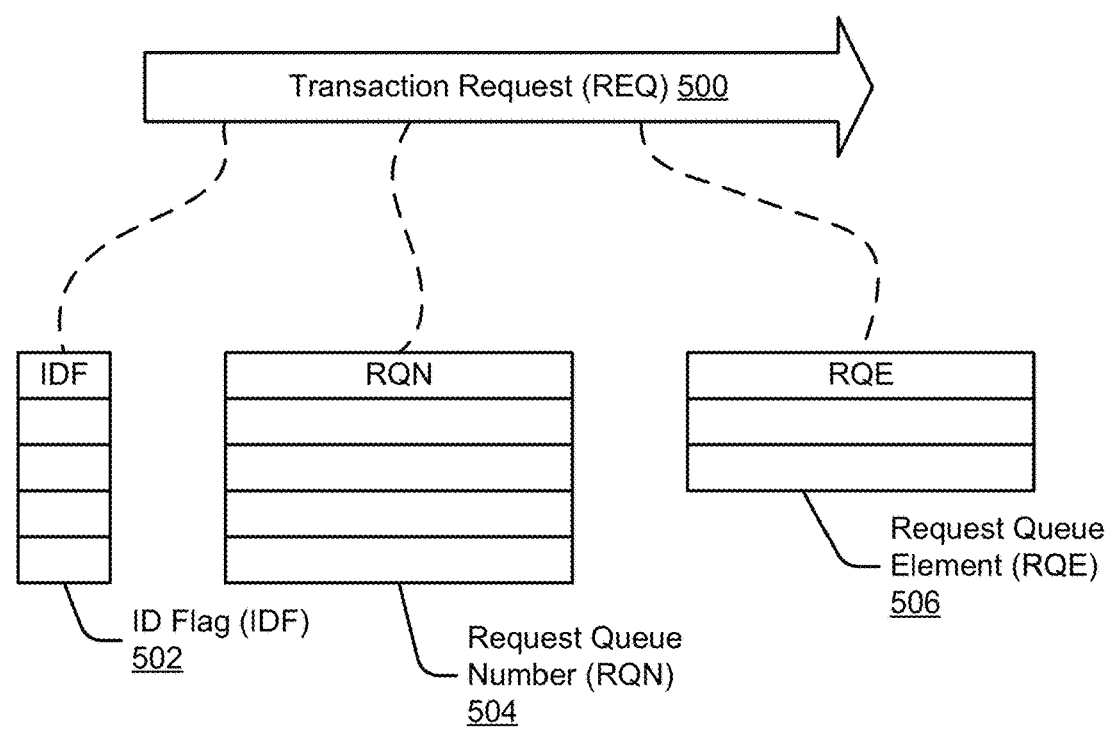
Figures 2, 5:
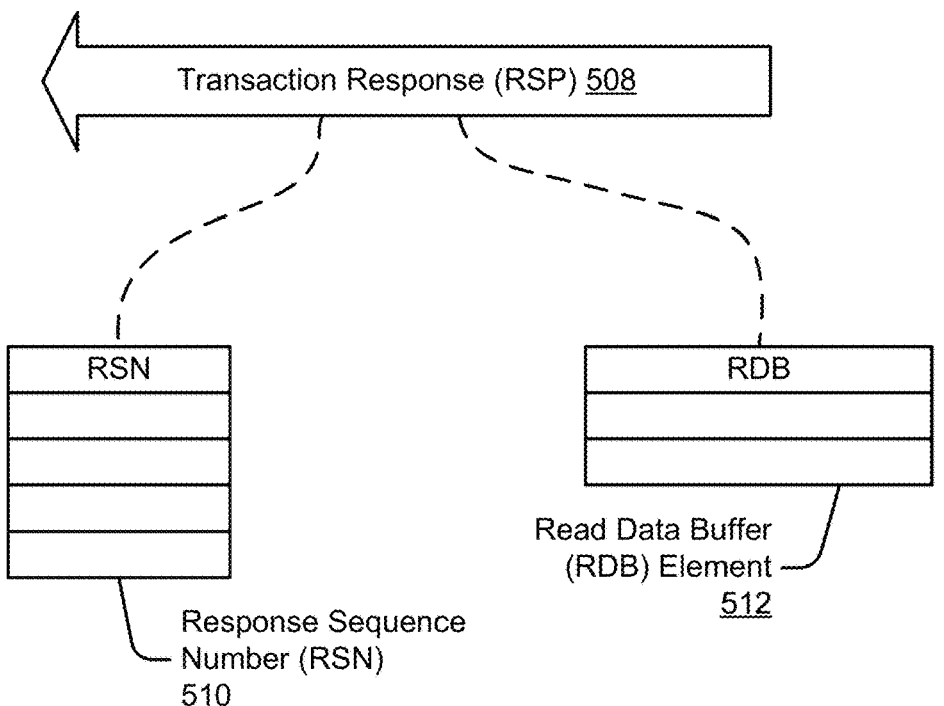

FIG. 1 illustrates an example device diagram 100 of a user device 102 in which systems and techniques for a low-latency bridge 116 to support out-of-order execution can be implemented. The user device 102 may include additional components and interfaces omitted from FIG. 1 for the sake of clarity.

The user device 102 can be a variety of consumer electronic devices. As non-limiting examples, the user device 102 can be a mobile phone 102-1, a tablet device 102-2, a laptop computer 102-3, a desktop computer 102-4, a computerized watch 102-5, a wearable device 102-6, a portable video game console 102-7, or a voice-assistant system 102-8.

The user device 102 can include one or more radio frequency (RF) transceivers 104 for communicating over wireless networks. The user device 102 can tune the RF transceivers 104 and supporting circuitry (e.g., antennas, front-end modules, amplifiers) to one or more frequency bands defined by various communication standards.

The user device 102 also includes an SoC 106. The SoC 106 generally integrates several components of the user device 102 into a single chip, including a central processing unit, memory, and input and output ports. The SoC 106 can include a single core or multiple cores. In the depicted implementation, the SoC 106 includes one or more clients 108 and a memory subsystem 110. The SoC 106 can include other components, including communication units (e.g., modems), input/output controllers, and system interfaces.

The clients 108 provide transaction requests to read or write data to random access memory (RAM) 112 of the memory subsystem 110. The clients 108 can include, as non-limiting examples, a display system, a graphics processing unit, a central processing unit, a communication unit, input/output controllers, and system interfaces of the SoC 106.

The memory subsystem 110 includes the RAM 112, a memory controller 114, and the bridge 116. The RAM 112 is a suitable storage device (e.g., static RAM (SRAM), dynamic RAM (DRAM), non-volatile RAM (NVRAM), synchronous dynamic RAM (SDRAM)) to store data accessible by the clients 108. In other implementations, the RAM 112 can be located outside the SoC 106.

The memory controller 114 manages the transaction requests of the clients 108 to the RAM 112. The memory controller 114 can buffer and serve the transaction requests to the RAM 112 to increase the bandwidth of the memory subsystem 110. In particular, the memory controller 114 can schedule the transaction requests to improve the bandwidth of an interface between the RAM 112 and the memory controller 114. The memory controller 114 can include hardware, firmware, software, or a combination thereof.

The bridge 116 can analyze the transaction requests and identify the degree of reordering for the transaction requests of a particular client 108. The bridge 116 can use a buffer 118 to temporarily store transaction requests or transaction responses of the clients 108. By performing this dynamic reordering using the reorder buffer 118, the bridge 116 can reduce the buffer space of the reorder buffer 118 to support in-order execution. In this way, the bridge 116 can minimize the latency introduced. The bridge 116 can include hardware, firmware, software, or a combination thereof.

A fabric (not illustrated in FIG. 1) is operatively connected to the clients 108 via respective virtual channels. The fabric can forward the transaction requests from the clients 108 to the memory controller 114. In some implementations, the fabric is a multiplexer. The bridge 116 can be implemented in the fabric, in any or all of the clients 108, as a stand-alone component in the SoC 106, or as a stand-alone component outside of the SoC 106.

The user device 102 also includes computer-readable storage media (CRM) 120. The CRM 120 is a suitable storage device (e.g., random-access memory (RAM), static RAM (SRAM), dynamic RAM (DRAM), non-volatile RAM (NVRAM), read-only memory (ROM), Flash memory) to store device data of the user device 102. The device data can include an operating system, one or more applications, user data, and multimedia data. In other implementations, the CRM 120 can store the operating system and a subset of the applications, user data, and multimedia data of the SoC 106.

The operating system generally manages hardware and software resources of the user device 102 and provides common services. The operating system and the applications are generally executable by the SoC 106 to enable communications and user interaction with the user device 102, which may require accessing data in the RAM 112 of the memory subsystem 110.

FIG. 2 illustrates an example device diagram 200 of the SoC 106 in which systems and techniques for the low-latency bridge to support out-of-order execution can be implemented. The SoC 106 and the memory subsystem 110 can include additional components, which are not illustrated in FIG. 2.

The SoC 106 includes multiple clients 108 and the memory subsystem 110. In the depicted implementation, the clients 108 include a Client A 108-1, a Client B 108-2, and a Client C 108-3. The SoC 106 can include fewer or additional clients 108. In this example, the clients 108 are located outside the memory subsystem 110. In other implementations, the clients 108 or a portion of the clients 108 can be located in the memory subsystem 110.

As described above, the clients 108 can provide transaction requests to read or write data to the RAM 112. One or more clients 108 can provide in-order requests 202 and out-of-order requests 204 to the memory subsystem 110. The in-order requests 202 represent transaction requests that generally must be returned in sequential order. The out-of-order requests 204 represent transaction requests that generally can be performed in any order and need not be returned in sequential order. In this example, the transaction requests of the Client A 108-1 include the in-order requests 202 and the out-of-order requests 204. Although not illustrated, Client B 108-2 may only provide in-order requests 202, and Client C 108-3 may only provide out-of-order requests 204.

The memory subsystem 110 includes the RAM 112, the memory controller 114, and the bridge 116. The RAM 112 includes at least one storage device. The RAM 112 includes two storage devices in the depicted implementation: an SDRAM 206-1 and an SDRAM 206-2. The SDRAM 206-1 and the SDRAM 206-2 can store data for the clients 108 or data accessible by the clients 108. The SDRAM 206-1 and the SDRAM 206-2 are operatively connected to the memory controller 114.

The memory controller 114 can include a buffer 208. The buffer 208 temporarily stores transaction requests of the clients 108. The buffer 208 or another component of the memory controller 114 can also send the transaction requests to the SDRAM 206-1 and the SDRAM 206-2 to increase bandwidth at the memory interface. The memory controller 114 can include additional components not illustrated in FIG. 2.

The bridge 116 can include the reorder buffer 118 and a controller 210. The reorder buffer 118 can temporarily store in-order requests 202 of the clients 108 or responses received out-of-order from the memory controller 114. The bridge 116 can use the controller 210 to analyze the transaction requests from a particular client 108 and determine the degree of reorder possible for those transaction requests. In this way, the bridge 116 can limit its use of buffer space in the reorder buffer 118 to that required to support the in-order degree for the particular client 108. In addition, by directly passing out-of-order requests 204 and portions of in-order requests 202 that can be carried out out-of-order, the controller 210 of the bridge 116 reduces the latency of the memory subsystem 110 in carrying out the transactions.

This document describes the operation of the memory subsystem 110, specifically the operations of the bridge 116 and the controller 210, in greater detail with respect to FIG. 3.

Example Configurations

This section illustrates an example configuration of a hardware-based memory subsystem with a low-latency bridge to support out-of-order execution, which may occur separately or together in whole or in part. This section describes the example configuration in relation to a drawing for ease of reading.

FIG. 3 illustrates an example diagram 300 of the memory subsystem 110 with a low-latency bridge to support out-of-order execution. The memory subsystem 110 can include additional components, which are not illustrated in FIG. 3, including the reorder buffer 118 and the controller 210. The memory subsystem 110 provides a hardware implementation to minimize latency in providing out-of-order execution of transaction requests from the clients 108. The memory subsystem 110 also provides a hardware implementation to minimize the size of the reorder buffer 118 (not illustrated in FIG. 3) of the bridge 116. In this way, the bridge 116 can increase the throughput of the SoC 106.

Similar to FIG. 2, the memory subsystem 110 includes one more RAMs 112 (e.g., the SDRAM 206-1 and the SDRAM 206-2), the memory controller 114, the bridge 116, and one or more clients 108 (e.g., the Client A 108-1, the Client B 108-2, the Client C 108-3). The memory subsystem 110 also includes a fabric 308. The clients 108 are operatively connected to the fabric 308 via internal busses. This document refers to the internal busses as virtual channels 302. Each virtual channel 302 can be assigned a unique identification.

In the depicted implementation, the Client A 108-1 is operatively connected to the fabric 308 via the virtual channel 302-1. The Client B 108-2 is operatively connected to the fabric 308 via the virtual channel 302-2, and the Client C 108-3 is operatively connected to the fabric 308 via the virtual channel 302-3.

The fabric 308 is operatively connected to the memory controller 114 via internal bus 304. The fabric 308 sends memory transactions from the clients 108 to the memory controller 114 via the internal bus 304. The memory controller 114 temporarily stores the transaction requests in the buffer 208 (not illustrated in FIG. 3).

The memory controller 114 is operatively connected to the SDRAMs 206 via internal busses 306. In the depicted implementation, the memory controller 114 is operatively connected to the SDRAM 206-1 and 206-2 via the internal busses 306-1 and 306-2, respectively. The memory controller 114 serves the transaction requests to the SDRAMs 206 via the respective internal busses 306.

The bridge 116 can temporarily store, using the reorder buffer 118, in-order requests 202 of the clients 108. The bridge 116 can analyze the transaction requests from a particular client 108 and determine the degree of reorder possible for those transaction requests. The analysis of the transaction requests is described in greater detail with respect to FIG. 4. In this way, the reorder buffer 118 can limit its use of buffer space to that required to support the in-order degree for the particular client 108. In addition, by directly passing out-of-order requests 204 and portions of in-order requests 202 that can be carried out out-of-order, the bridge 116 reduces the latency of the memory subsystem 110 in carrying out the transactions.

In operation, the bridge 116 can process requests from the clients 108 and responses from the memory subsystem 110 to improve the throughput of the SoC 106. The processing of transaction requests by the bridge 116 is described in greater detail with respect to FIG. 6. The processing of transaction responses by the bridge 116 is described in greater detail with respect to FIG. 7.

As depicted in FIG. 3, the memory subsystem 110 can implement the bridge 116 in hardware. In other implementations, the out-of-order execution of transaction requests can be implemented in at least some part at the kernel level or a driver level.

Figure 4:
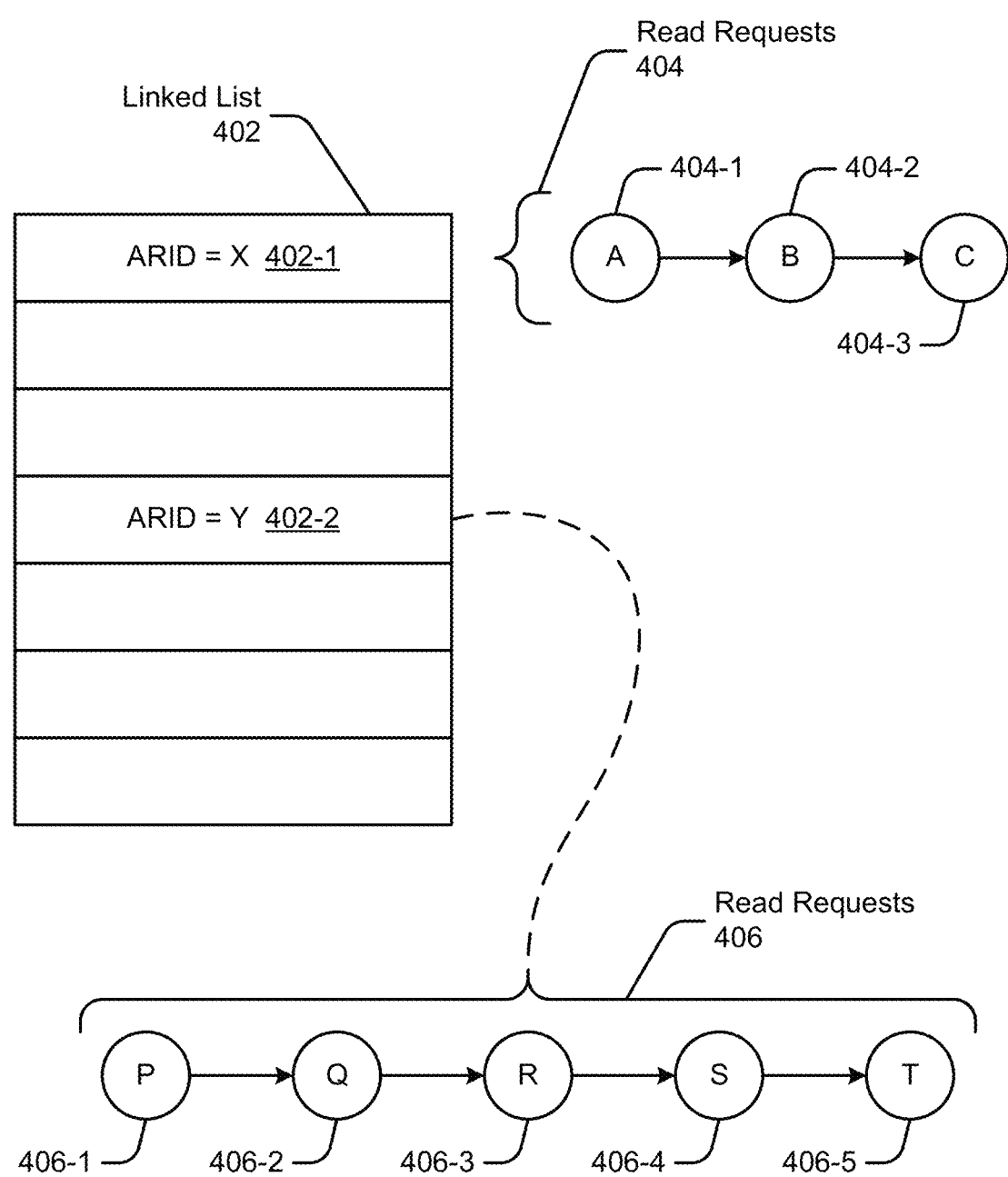
FIG. 4 illustrates an example linked list of the described low-latency bridge to support out-of-order execution.

FIG. 4 illustrates an example linked list structure 402 of the described low-latency bridge to support out-of-order execution. The bridge of FIG. 4 can be the bridge 116 of FIGS. 1 through 3.

The bridge 116 can receive read requests (e.g., read requests 404 and read requests 406). Read requests that have the same request ID (ARID) require that responses arrive in the same order. For example, the read requests 404 include read requests 404-1, 404-2, and 404-3. The read requests 404-1, 404-2, and 404-3 have an ARID corresponding to "X" as indicated by the linked-list entry 402-1. Similarly, the read requests 406 include read requests 406-1, 406-2, 406-3, 406-4, and 406-5, which have an ARID corresponding to "Y" as indicated by the linked-list entry 402-2. Read requests that have different ARID can have responses reordered. Responses associated with read requests that have the same ARID are returned to the corresponding client 108 in-order.

The bridge 116 can maintain the linked list 402 to track read requests and order the corresponding responses thereto. The number of entries in the linked list 402 is generally equal to the number of clients operatively connected to the memory subsystem 110 and the bridge 116.

As it receives a transaction request (e.g., the read request 404-1), the bridge 116 checks the associated ARID against a bit flag to determine if there is a pending read request 404 with the same ARID. If a match is found, the bridge 116 appends the current read request (e.g., the read request 404-2) to the linked list entity (e.g., the linked list entry 402-1) for the given ARID. For example, if the bridge 116 receives the read request 404-2 after previously receiving the read request 404-1, it will append the read request 404-2 to the linked list entity 402-1 associated with the ARID of X. If a match is not found, the bridge 116 assigns the read request 404 to a new linked list entity associated with the read request 404.

FIGS. 5-1 and 5-2 illustrate example data associated with a transaction request 500 and a transaction response 508 for a low-latency bridge to support out-of-order execution. The bridge of FIG. 4 can be the bridge 116 of FIGS. 1 through 3.

As illustrated in FIG. 5-1, the bridge 116 can receive the transaction request (REQ) 500 (e.g., the read requests 404 and the read requests 406). The transaction request 500 can include a request ID (ARID) and an address for the data being requested. To process in-order requests from clients when responses may be returned from the memory controller out-ororder, the bridge 116 can generate one or more variables for or data associated with each transaction request. Examples of such values are an ID flag (IDF) 502, a request queue number (RQN) 504, and a request queue element (RQE) 506. The transaction request 500 or associated data can include additional content not illustrated in FIG. 5-1.

The ID flag 502 is a flag for the request ID (ARID) of the transaction request 500. The ID flag 502 is generally a one-bit flag. The ID flag 502 can be initialized at reset and have all bits set to zero after reset.

For each incoming request ID (ARID), the bridge 116 stores the request queue number 504 of the transaction request 500. The request queue number 504 indicates a sequence numbering (e.g., ordering) for the transaction request 500 within a set of transaction requests with the same ARID. The bridge 116 uses the request queue number 504 to determine the ordering of a transaction response 508 associated with the transaction request 500. The request queue number 504 provides a running counter for each ARID. The depth of the request queue number 504 can be equal to two raised to the depth of the read data buffer (RDB) element 512 (e.g., $2^{\wedge}(\text{RDB depth bits})$). The counter for the request queue number 504 can run from zero to its width minus one (e.g., $2^{\wedge}(\text{RDB depth bits})-1$).

The bridge 116 stores context related to the transaction request 500 in the request queue element 506. The bridge 116 generally only stores the context required for reordering the transaction responses 508 and can omit other context to reduce memory demands. In example implementations, the bridge does not store the head or first element of any linked list into the reorder buffer 118 to reduce latency or lower storage demands (or both).

As illustrated in FIG. 5-2, the bridge 116 can transmit the transaction response (RSP) 508 to the respective client. The transmission response 508 can include the ARID or the addresses being accessed and the data retrieved for the request. To process the out-of-order responses, the bridge 116 can create a response sequence number (RSN) 510 and a read data buffer (RDB) element 512. The transmission response 508 can include additional content not shown in FIG. 5-2.

The response sequence number 510 indicates a sequence numbering for the transaction response 508 within a set of transaction responses with the same ARID. The bridge 116 uses the response sequence number 510 to determine the ordering of the transaction response 508. The response sequence number 510 provides a running counter for each ARID. The depth of the response sequence number 510 is equal to two raised to the depth of the read data buffer (RDB) element 512 (e.g., $2^{\wedge}(\text{RDB depth bits})$). The counter for the response sequence number 510) can run from zero to its width minus one (e.g., $2^{\wedge}(\text{RDB depth bits})-1$).

The bridge 116 stores the read data buffer element 512, which corresponds to read data related to the transaction response 508, in the reorder buffer 118. The bridge 116 generally only stores the read data associated with transaction responses 508 that are reordered. The head or first element of any linked list is not stored into the reorder buffer 118. The bridge 116 checks the response sequence number 510 to identify whether the incoming transaction response 508 is the head or first response of a linked list or not.

Figure 6:
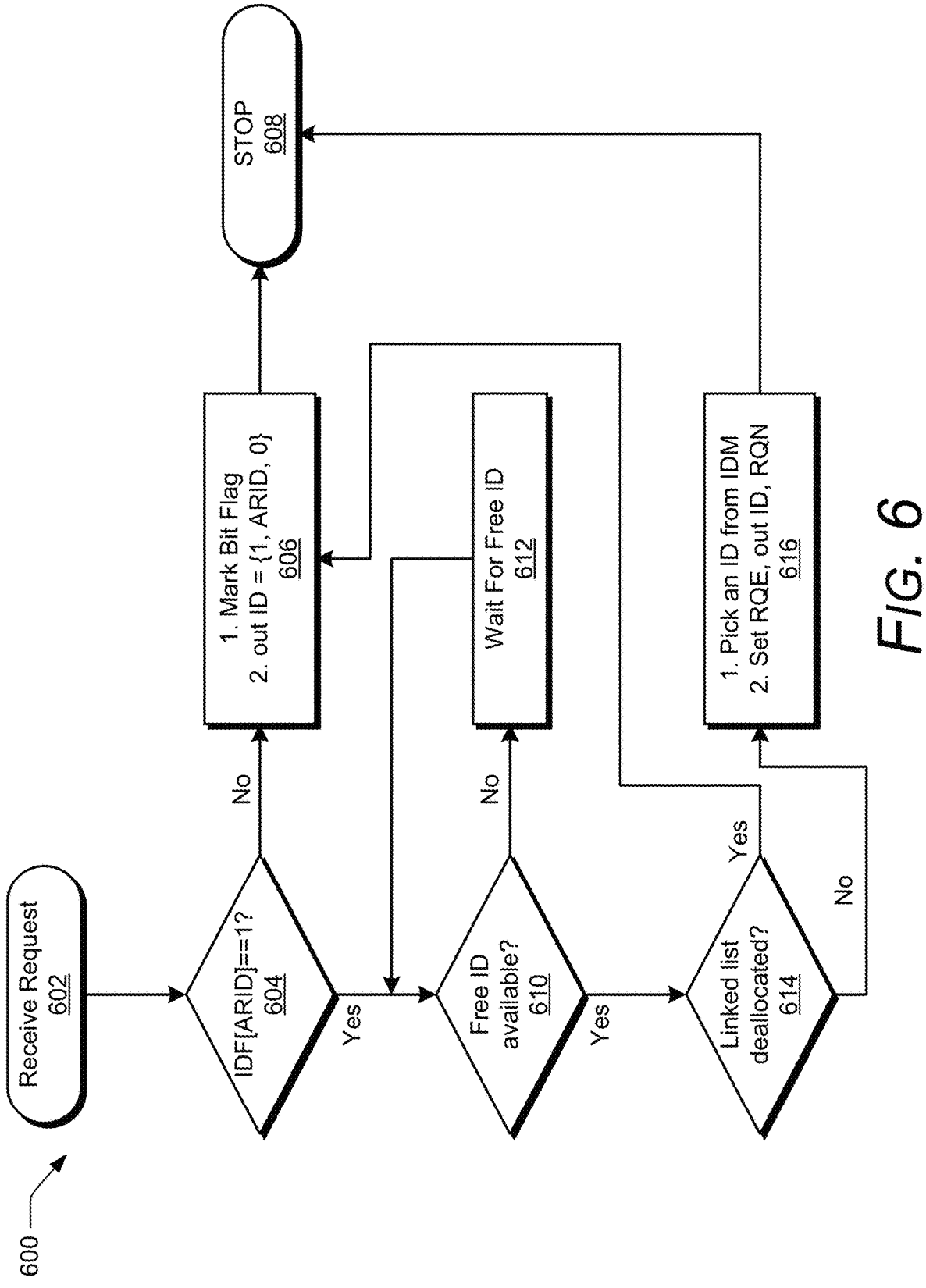
FIG. 6 illustrates a flow chart of example operations of a low-latency bridge to support out-of-order execution in response to a transaction request.

FIG. 6 illustrates a flow chart of example operations 600 of a low-latency bridge to support out-of-order execution in response to a transaction request. The operations 600 are described below in the context of the bridge 116 of FIGS. 1 through 3. The operations 600 may be performed in a different order than that illustrated in FIG. 6 or with additional or fewer operations.

At 602, the bridge 116 receives a transaction request. For example, the client A 108-1 can send a read request to access data in the SDRAM 206-1.

At 604, the bridge 116 checks a request ID (ARID) of the transaction request against a bit flag (IDF) to determine whether there is a pending transaction request with the same request ID. For example, the bridge 116 can check whether the ID flag associated with the request ID is equal to one (e.g., IDF[ARID]==1) or another value associated with the first transaction request in a set of in-order transaction requests.

At 606, if an ARID match is not found, the bridge 116 sets the value for the bit flag (IDF) and sets the value for the request ID (ARID) (e.g., out ID={1, ARID, 0)}).

At 608, the operations 600 end. At 610, if an ARID match is found, the bridge 116 checks the availability of a free ID (e.g., free space) in the ID manager (IDM) (e.g., the controller 210). The IDM assigns free IDs to outgoing transaction requests (e.g., received read requests being sent to the memory controller 114) if they are not the head or first item of a given linked list. The free IDs can represent a unique ID for the transaction request within a certain linked list.

At 612, if a free ID is not available, the bridge 116 waits for a free ID. For example, if no free ID is available, then the transaction request is stalled.

At 614, if a free ID is available, the bridge 116 determines whether the linked list is getting deallocated in the same cycle.

At 616, if the linked list is not getting deallocated in the same cycle, the bridge 116 selects an ID from the IDM. The bridge 116 appends the current transaction request to the linked list entry for the given ARID and incrementally increases the request queue number (RQN) (e.g., RQN[ARID]=RQN[ARID]+1). Context or data related to the current transaction request is stored in the request queue element (RQE) (e.g., RQE[IDM_ID]={curr_seq_num, prev_tail_ptr, 1}). In addition, the out ID is set (e.g., out ID={0, ARID, IDM_ID}). Upon completion, the bridge 116 proceeds to operation 608 and the operations 600 end.

If the linked list is not getting deallocated in the same cycle, the bridge 116 performs operation 606. Specifically, the bridge 116 sets the value for the bit flag (IDF) and the request ID (ARID) (e.g., out ID={1, ARID, 0)}).

Figure 7:
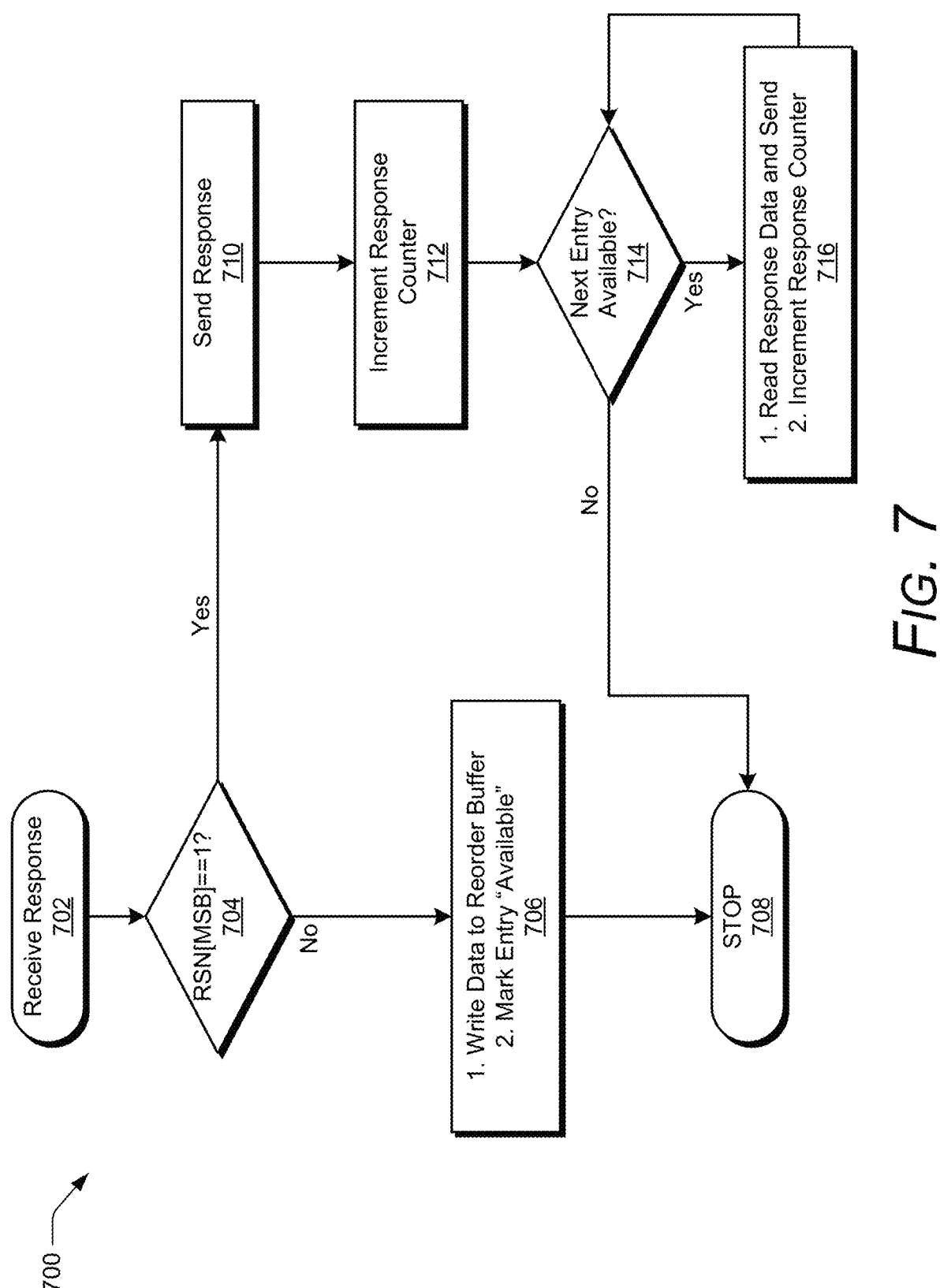
FIG. 7 illustrates a flow chart of example operations of a low-latency bridge to support out-of-order execution in response to a transaction response.

FIG. 7 illustrates a flow chart of example operations 700 of a low-latency bridge to support out-of-order execution in response to a transaction response. The operations 700 are described below in the context of the bridge 116 of FIGS. 1 through 3. The operations 700 may be performed in a different order than that illustrated in FIG. 7 or with additional or fewer operations.

At 702, the bridge 116 receives a transaction response. For example, the memory controller 114 can send a read response from the SDRAM 206-1 intended for the client A 108-1.

At 704, the bridge 116 determines whether the response sequence number (RSN) is equal to one (e.g., RSN[MSB]==1?). For example, the bridge 116 determines whether the transaction response is the head or first response of the linked list. The bridge 116 can also determine whether the transaction response is the next response of the linked list to be sent to the client A 108-1. The response sequence numbers indicate an order in which the transaction responses are to be returned to Client A 108-1.

At 706, if the RSN is not equal to one, the bridge 116 writes the data of the transaction response to the reorder buffer 118. The bridge 116 can also mark the entry associated with the RSN as available.

At 708, the operations 700 end.

At 710, if the RSN is equal to one, the bridge 116 sends the transaction response without storing it in the reorder buffer 118. For example, the transaction response can be sent to the client A 108-1 and avoid storage of the transaction response (e.g., without buffering).

At 712, the bridge 116 increments a response counter by one.

At 714, the bridge 116 determines whether the next entry in the linked list is available. If the next entry is not available, the operations 700 end at operation 708.

At 716, if the next entry in the linked list is available, the bridge 116 reads the response data from the reorder buffer 118 and sends the response to the corresponding client. The bridge 116 can also increment the response counter by one. The bridge 116 then repeats operation 714 to check whether the next entry in the linked list is available.

Example Methods

FIG. 8 is a flowchart illustrating example operations 800 of a low-latency bridge to support out-of-order execution. The operations 800 are described in the context of the memory subsystem 110 of FIGS. 1 through 7. The operations 800 may be performed in a different order or with additional or fewer operations.

At 802, multiple transaction requests from a first client of one or more clients is received by a bridge. The bridge can be operatively connected to a memory controller of an apparatus and include a reorder buffer. The memory controller can be operatively connected to one or more memories and processes transaction requests from the one or more clients to access data in the one or more memories. For example, the apparatus can be the user device 102 that includes the SoC 106 with the memory subsystem 110. The apparatus can also be the SoC 106 that is embedded in the user device 102. The memory subsystem 110 includes the memory controller 114 operatively connected to the RAM 112. The memory controller 114 can process transaction requests, including the in-order requests 202 and the out-of-order requests 204, from the clients 108 to access data in the RAM 112. The memory subsystem 110 also includes the bridge 116, which includes the reorder buffer 118, operatively connected to the memory controller 114 and the clients 108. The bridge 116 can receive transaction requests from Client A 108-1.

At 804, multiple transaction responses can be received from the memory controller. Each transaction response is associated with a corresponding transaction request and is to be returned by the bridge in-order to the first client. For example, the bridge 116 can receive transaction responses from the memory controller 114. Each transaction response is associated with a corresponding transaction request. The bridge 116 returns the transaction responses in-order to Client A 108-1.

At 806, data associated with a first transaction response is sent to the first client responsive to receiving the first transaction response. The data is sent by the bridge and bypasses storage in the reorder buffer. For example, responsive to receiving a first transaction response of the multiple transaction responses, the bridge 116 sends data associated with the first transaction response to Client A 108-1 and bypasses storing the data in the reorder buffer 118.

The bridge 116 can transmit the multiple transaction responses to Client A 108-1 according to response sequence numbers assigned to the transaction responses. The response sequence numbers indicate an order in which the transaction responses are to be returned to Client A 108-1. In response to receiving each transaction response from the memory controller 114, the bridge 116 can determine a response sequence number associated with the transaction response. Responsive to the response sequence number corresponding to the transaction response being first (e.g., equal to one) and being the head element of a linked list or first transaction response, the bridge 116 can send data associated with the transaction response to Client A 108-1. Responsive to the response sequence number not corresponding to the transaction response being first or the head entry of the linked list, the bridge 116 can write data associated with the transaction response to the reorder buffer 118 and mark the response sequence number as available for sending to Client A 108-1. The bridge 116 can also send the data associated with the first transaction response to Client A 108-1 without storing the data in the reorder buffer 118 based on an absence of a related out-of-order transaction request being present in the reorder buffer 118.

In response to sending the first transaction response to Client A 108-1, the bridge 116 can determine whether a second transaction response with a response sequence number corresponding to the second transaction response being second (e.g., equal to two) is available for sending to Client A 108-1. Responsive to determining that the second transaction response is available for sending to Client A 108-1, the bridge 116 can read data associated with the second transaction response from the reorder buffer 118. The bridge 116 can then send the data associated with the second transaction response to Client A 108-1 and increment a response counter value by one. The response counter value has a value that incrementally increases (e.g., from one) and indicates a next transaction response to send to Client A 108-1. The response sequence number and the response counter value are associated with a request identification (ARID) that indicates a set of transaction requests to be returned by the bridge 116 in-order.

In other implementations and in response to receiving each transaction response from the memory controller 114, the bridge 116 can determine a response sequence number associated with the transaction response. The bridge can determine a response counter value that indicates a next transaction response to send to Client A 108-1. The response counter value incrementally increases (e.g., from one). Responsive to the response sequence number being equal to the response counter value, the bridge 116 can send data associated with the transaction response to Client A 108-1. Responsive to the response sequence number not being equal to the response counter value, the bridge 116 can write data associated with the transaction response to the reorder buffer 118 and mark the response sequence number as available for sending to Client A 108-1.

In response to sending the first transaction response to Client A 108-1, the bridge 116 can increment the response counter value by one. The bridge 116 can then determine whether another transaction response with a response sequence number equal to the response counter value is available for sending to Client A 108-1. Responsive to determining that the other transaction response with the response sequence number equal to the response counter value is available for sending to Client A 108-1, the bridge 116 can read data associated with the other transaction response from the reorder buffer 118. The bridge 116 can then send the data associated with the other transaction response to Client A 108-1 and increment the response counter value by one.

In response to receiving a first transaction request from Client A 108-1, the bridge 116 can determine a request identification associated with the first transaction request. The bridge 116 can then determine whether the request identification matches the request identification of another transaction request pending in the memory subsystem 110. Responsive to a determination that the request identification matches the request identification of another transaction request pending in the memory subsystem 110, the bridge 116 can append the first transaction request to a linked list associated with the request identification. The bridge 116 can also determine whether a response sequence number is available for the first transaction request. Responsive to a determination that a response sequence number is available for the first transaction request, the bridge 116 can assign a first response sequence number to the first transaction request. The first response sequence number can have a value that is incrementally larger than a value of the response sequence number of the other transaction request. Responsive to a determination that a response sequence number is not available for the first transaction request, the bridge 116 can stall execution of the first transaction request until a response sequence number is available.

Responsive to a determination that the request identification does not match the request identification of another transaction request pending in the memory subsystem 110, the bridge 116 can assign a value to an identification flag for the request identification associated with the first transaction request. The identification flag can be a one-bit flag for the request identification associated with the first transaction request. The identification flag can be initialized and changed to zero bits after resetting by the bridge 116.

Example Device and System

Figure 9:
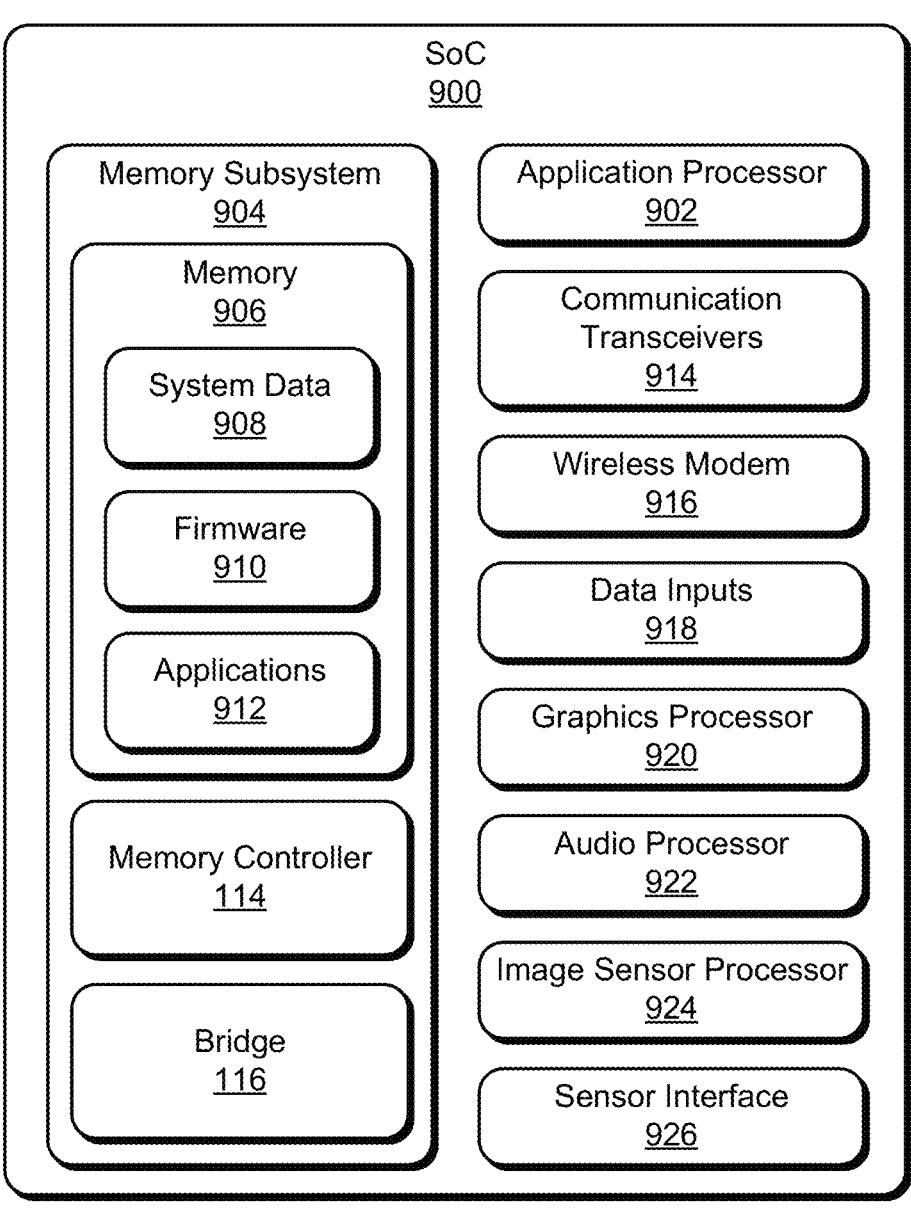
FIG. 9 illustrates an example SoC that may implement aspects of the described low-latency bridge to support out-of-order execution.

FIG. 9 illustrates an example SoC 900 that may implement aspects of the described low-latency bridge to support out-of-order execution. The SoC 900 may be embodied as or within any type of user device 102, user equipment, apparatus, other device, or system as described with reference to FIGS. 1 through 8 to implement aspects of the described low-latency bridge. Although described with reference to chip-based packaging, the components illustrated in FIG. 9 may also be embodied as other systems or component configurations, such as an FPGA, ASIC, application-specific standard product (ASSP), digital signal processor (DSP), complex programmable logic device (CPLD), system-in-package (SiP), package-on-package (POP), processing and communication chip set, communication co-processor, sensor co-processor, or the like.

In this example, the SoC 900 includes one or more application processors 902 (e.g., processor cores), which process various computer-executable instructions to control the operation of the SoC 900 and to enable techniques for the described low-latency bridge (e.g., the bridge 116). Alternatively or additionally, the SoC 900 can be implemented with any one or combination of hardware, firmware, or fixed logic circuitry that is implemented in connection with processing and control circuits (not illustrated in FIG. 9). Although not shown, the SoC 900 may also include a bus, interconnect, crossbar, or fabric that couples the various components within the system.

The SoC 900 also includes a memory subsystem 904 that is similar to or the same as the memory subsystem 110 described with respect to FIGS. 1 through 8. The memory subsystem 904 includes memory 906 (e.g., computer-readable storage media), such as one or more memory circuits that enable persistent or non-transitory data storage, and thus do not include transitory signals or carrier waves. Examples of the memory 906 include RAM, non-volatile memory (e.g., ROM, EPROM, EEPROM, etc.), or flash memory. The memory 906 provides data storage for system data 908, as well as for firmware 910, applications 912, and any other types of information or data related to operational aspects of the SoC 900. For example, the firmware 910 can be maintained as processor-executable instructions of an operating system (e.g., real-time OS) within the memory 906 and executed on the application processor 902.

The applications 912 may include a system manager, such as any form of a control application, software application, signal-processing and control module, code that is native to a particular system, an abstraction module or gesture module and so on. The memory 906 may also store system components or utilities for implementing aspects of the described low-latency bridge.

The memory subsystem 904 also includes a memory controller 114 and the bridge 116 implemented in accordance with one or more aspects of the described low-latency bridge. Generally, the memory controller 114 and the bridge 116 are coupled between the application processor 902 and functional blocks (e.g., the clients 108) of the SoC 900 to enable the described techniques and methods of the bridge 116. In this example, the SoC 900 also includes a variety of function blocks or processors 914 through 926, any of which may be implemented as a client 108 that issues in-order or out-of-order transaction requests to the memory subsystem 904 to be processed by the bridge 116 as described herein.

As shown in FIG. 9, the SoC 900 includes communication transceivers 914 and a wireless modem 916 that enable wired or wireless communication of the system data 908 (e.g., received data, data that is being received, data scheduled for broadcast, packetized, or the like). In some aspects, the wireless modem 916 is a multi-mode multi-band modem or baseband processor that is configurable to communicate in accordance with various communication protocols or in different frequency bands. The wireless modem 916 may include a transceiver interface (not shown) for communicating encoded or modulated signals with transceiver circuitry (e.g., the RF transceiver 104).

The SoC 900 can include one or more data inputs 918 via which any type of data, media content, or inputs can be received, such as user input, user-selectable inputs (explicit or implicit), or any other type of audio, video, or image data received from a content or data source. Alternatively or additionally, the data inputs 918 may include various data interfaces, which can be implemented as any one or more of a serial or parallel interface, a wireless interface, a network interface, and as any other type of communication interface enabling communication with other devices or systems.

The SoC 900 also includes additional processors or co-processors (e.g., the clients 108 of FIGS. 1 through 8) to enable other functionalities, such as a graphics processor 920, audio processor 922, and image sensor processor 924. The graphics processor 920 may render graphical content associated with a user interface, operating system, or applications of the SoC 900. In some cases, the audio processor 922 encodes or decodes audio data and signals, such as audio signals and information associated with voice calls or encoded audio data for playback. The image sensor processor 924 may be coupled to an image sensor and provide image data processing, video capture, and other visual media conditioning and processing functions. The SoC can also include a sensor interface 926. The sensor interface 926 enables the SoC 900 to receive data from various sensors, such as capacitance and motion sensors.

Examples

In the following section, examples are provided.

Example 1: An apparatus comprising: a memory controller operatively connected to one or more memories, the memory controller configured to process transaction requests from one or more clients to access data in the one or more memories; and a bridge operatively connected to the memory controller and the one or more clients, the bridge comprising a reorder buffer and configured to: receive multiple transaction requests from a first client of the one or more clients; receive multiple transaction responses from the memory controller, each transaction response being associated with a corresponding transaction request of the multiple transaction requests, the multiple transaction responses to be returned by the bridge in-order to the first client; and responsive to a first transaction response of the multiple transaction responses being received, bypass storing in the reorder buffer data associated with the first transaction response and send the data to the first client.

Example 2: The apparatus of example 1, wherein the bridge is further configured to transmit the multiple transaction responses to the first client according to response sequence numbers assigned to the multiple transaction responses, the response sequence numbers indicating an order in which the multiple transaction responses are to be returned to the first client.

Example 3: The apparatus of example 1, wherein the bridge, responsive to receiving each transaction response of the multiple transaction responses from the memory controller, is further configured to: determine a response sequence number associated with the transaction response; responsive to the response sequence number corresponding to the transaction response being first, send data associated with the transaction response to the first client, the transaction response being the first transaction response; and responsive to the response sequence number not corresponding to the transaction response being first, write data associated with the transaction response to the reorder buffer and mark the response sequence number as available for sending to the first client.

Example 4: The apparatus of example 3, wherein the bridge, responsive to sending the first transaction response to the first client, is further configured to: determine whether a second transaction response with a response sequence number corresponding to the second transaction response being second and available for sending to the first client; and responsive to a determination that the second transaction response is available for sending to the first client; read data associated with the second transaction response from the reorder buffer; send the data associated with the second transaction response to the first client; and increment a response counter value by one, the response counter value having a value that incrementally increases and indicating a next transaction response to send to the first client.

Example 5: The apparatus of example 1, wherein the bridge, responsive to receiving each transaction response of the multiple transaction responses from the memory controller, is further configured to: determine a response sequence number associated with the transaction response; determine a response counter value, the response counter value having a value that incrementally increases and indicating a next transaction response to send to the first client; responsive to the response sequence number being equal to the response counter value, send data associated with the transaction response to the first client; and responsive to the response sequence number not being equal to the response counter value, write data associated with the transaction response to the reorder buffer and mark the response sequence number as available for sending to the first client.

Example 6: The apparatus of example 5, wherein the bridge, responsive to sending the transaction response to the first client, is further configured to: increment the response counter value by one; determine whether another transaction response with a response sequence number equal to the response counter value is available for sending to the first client; and responsive to a determination that the other transaction response with the response sequence number equal to the response counter value is available for sending to the client; read data associated with the other transaction response from the reorder buffer; send the data associated with the other transaction response to the first client; and increment the response counter value by one.

Example 7: The apparatus of any one of examples 4 through 6, wherein the response sequence number and the response counter value are associated with a request identification, the request identification indicating a set of transaction requests to be returned in-order by the bridge.

Example 8: The apparatus of any one of examples 1 through 7, wherein the bridge, responsive to receiving a first transaction request from the first client, is further configured to: determine a request identification associated with the first transaction request; determine whether the request identification matches the request identification of another transaction request pending in the memory subsystem; responsive to a determination that the request identification matches the request identification of another transaction request pending in the memory subsystem, append the first transaction request to a linked list associated with the request identification; and responsive to a determination that the request identification does not match the request identification of another transaction request pending in the memory subsystem, assign a value to an identification flag for the request identification associated with the first transaction request.

Example 9: The apparatus of example 8, wherein the bridge, responsive to the determination that the request identification matches the request identification of another transaction request pending in the memory subsystem, is further configured to: determine whether a response sequence number is available for the first transaction request; and responsive to a determination that a response sequence number is available for the first transaction request, assign a first response sequence number to the first transaction request, the first response sequence number having a value that is incrementally larger than a value of the response sequence number of the other transaction request.

Example 10: The apparatus of example 9, wherein the bridge, responsive to a determination that a response sequence number is not available for the first transaction request, is further configured to stall execution of the first transaction request until a response sequence number is available.

Example 11: The apparatus of any one of examples 8 through 10, wherein the identification flag comprises a one-bit flag for the request identification associated with the first transaction request.

Example 12: The apparatus of example 11, wherein the identification flag is initialized and changed to zero bits after resetting by the bridge.

Example 13: The apparatus of any one of examples 1 through 12, wherein the bridge is further configured to send the data associated with the first transaction response to the first client without storing the data in the reorder buffer based on an absence of a related out-of-order transaction request being present in the reorder buffer.

Example 14: The apparatus of any one of examples 1 through 13, wherein the apparatus comprises a system on chip (SoC) embedded in a user device.

Example 15: The apparatus of example 14, wherein the user device comprises a mobile phone, a laptop, a tablet, a portable video game console, or a wearable device.

Example 16: The apparatus of any one of examples 1 through 12, wherein the memory controller comprises an application-specific integrated circuit (ASIC) memory controller.

Example 17: A method comprising: receiving, by a bridge, multiple transaction requests from a first client of one or more clients, the bridge operatively connected to the one or more clients and comprising a reorder buffer; receiving, by the bridge, multiple transaction responses from a memory controller, each transaction response being associated with a corresponding transaction request of the multiple transaction requests, the multiple transaction responses to be returned by the bridge in-order to the first client, the memory controller operatively connected to one or more memories and configured to process transaction requests from the one or more clients to access data in the one or more memories; and responsive to a first transaction response of the multiple transaction responses being received, bypassing storing in the reorder buffer data associated with the first transaction response and sending the data to the first client.

Example 18: The method of example 17, the method further comprising: transmitting the multiple transaction responses to the first client according to response sequence numbers assigned to the multiple transaction responses, the response sequence numbers indicating an order in which the multiple transaction responses are to be returned to the first client.

Example 19: The method of example 17, the method further comprising in response to receiving each transaction response of the multiple transaction responses from the memory controller: determining a response sequence number associated with the transaction response; responsive to the response sequence number corresponding to the transaction response being first, sending data associated with the transaction response to the first client, the transaction response being the first transaction response; and responsive to the response sequence number not corresponding to the transaction response being first, writing data associated with the transaction response to the reorder buffer and marking the response sequence number as available for sending to the first client.

Example 20: The method of example 19, the method further comprising in response to sending the first transaction response to the first client; determining whether a second transaction response with a response sequence number corresponding to the second transaction response being second is available for sending to the first client; and responsive to determining that the second transaction response is available for sending to the first client: reading data associated with the second transaction response from the reorder buffer; sending the data associated with the second transaction response to the first client; and incrementing a response counter value by one, the response counter value having a value that incrementally increases and indicating a next transaction response to send to the first client.

Example 21: The method of example 17, the method further comprising in response to receiving each transaction response of the multiple transaction responses from the memory controller: determining a response sequence number associated with the transaction response; determining a response counter value, the response counter value having a value that incrementally increases and indicating a next transaction response to send to the first client; responsive to the response sequence number being equal to the response counter value, sending data associated with the transaction response to the first client; and responsive to the response sequence number not being equal to the response counter value, writing data associated with the transaction response to the reorder buffer and marking the response sequence number as available for sending to the first client.

Example 22: The method of example 21, the method further comprising in response to sending the transaction response to the first client; incrementing the response counter value by one; determining whether another transaction response with a response sequence number equal to the response counter value is available for sending to the first client; and responsive to determining that the other transaction response with the response sequence number equal to the response counter value is available for sending to the client: reading data associated with the other transaction response from the reorder buffer; sending the data associated with the other transaction response to the first client; and incrementing the response counter value by one.

Example 23: The method of any one of examples 20 through 22, wherein the response sequence number and the response counter value are associated with a request identification, the request identification indicating a set of transaction requests to be returned in-order by the bridge.

Example 24: The method of any one of examples 17 through 23, the method further comprising in response to receiving a first transaction request from the first client; determining a request identification associated with the first transaction request; determining whether the request identification matches the request identification of another transaction request pending in the memory subsystem; responsive to determining that the request identification matches the request identification of another transaction request pending in the memory subsystem, appending the first transaction request to a linked list associated with the request identification; and responsive to determining that the request identification does not match the request identification of another transaction request pending in the memory subsystem, assigning a value to an identification flag for the request identification associated with the first transaction request.

Example 25: The method of example 24, the method further comprising in response to determining that the request identification matches the request identification of another transaction request pending in the memory subsystem: determining whether a response sequence number is available for the first transaction request; and responsive to determining that a response sequence number is available for the first transaction request, assigning a first response sequence number to the first transaction request, the first response sequence number having a value that is incrementally larger than a value of the response sequence number of the other transaction request.

Example 26: The method of example 9, the method further comprising in response to determining that a response sequence number is not available for the first transaction request, stalling execution of the first transaction request until a response sequence number is available.

Example 27: The method of any one of examples 24 through 26, wherein the identification flag comprises a one-bit flag for the request identification associated with the first transaction request.

Example 28: The method of example 27, wherein the identification flag is initialized and changed to zero bits after resetting by the bridge.

Example 29: The method of any one of examples 17 through 28, the method further comprising sending the data associated with the first transaction response to the first client without storing the data in the reorder buffer based on an absence of a related out-of-order transaction request being present in the reorder buffer.

CONCLUSION

While various configurations and methods for a low-latency bridge to support out-of-order execution have been described in language specific to features and/or methods, it is to be understood that the subject of the appended claims is not necessarily limited to the specific features or methods described. Rather, the specific features and methods are disclosed as non-limiting examples of a low-latency bridge to support out-of-order execution.

What is claimed is:

1. An apparatus comprising:
a memory controller operatively connected to one or more memories, the memory controller configured to process transaction requests from one or more clients to access data in the one or more memories; and
a bridge operatively connected to the memory controller and the one or more clients, the bridge comprising a reorder buffer and configured to:
receive multiple transaction requests from a first client of the one or more clients;
receive multiple transaction responses from the memory controller, each transaction response of the multiple transaction responses being associated with a corresponding transaction request of the multiple transaction requests, the multiple transaction responses to be returned, by the bridge, in-order to the first client;
responsive to receiving each transaction response of the multiple transaction responses:
determine a response sequence number associated with the transaction response;
determine a response counter value, the response counter value having a value that incrementally increases and indicates a next transaction response to send to the first client; and
responsive to the response sequence number being equal to the response counter value, transmit data associated with the transaction response to the first client; or
responsive to the response sequence number not being equal to the response counter value, store data associated with the transaction response to the reorder buffer and set the response sequence number associated with the transaction response as available.

2. The apparatus of claim 1, wherein the transaction response comprises a first transaction response associated with the corresponding transaction request of the first client.

3. The apparatus of claim 2, wherein the bridge is further configured to:
determine whether a response sequence number of a second transaction response of the multiple transaction responses is next in an order in which the multiple transaction responses are to be returned; and responsive to a determination that data of the second transaction response is available in the reorder buffer for sending to the first client:

read data associated with the second transaction response from the reorder buffer;

transmit the data associated with the second transaction response to the first client; and increment a response counter value by one effective to indicate a next transaction response to send to the first client.

4. The apparatus of claim 2, wherein the bridge is further configured to:

determine whether a response sequence number of another transaction response of the multiple transaction responses is equal to the response counter value; and responsive to a determination that the other transaction response with the response sequence number equal to the response counter value is available for sending to the first client:

read data associated with the other transaction response from the reorder buffer;

transmit the data associated with the other transaction response to the first client; and increment the response counter value by one.

5. The apparatus of claim 1, wherein;

the response sequence numbers or the response counter value is associated with a request identifier for the multiple transaction responses that are to be returned by the bridge in-order.

6. The apparatus of claim 1, wherein:

the multiple transaction requests comprise a first transaction request; and the bridge, responsive to receiving the first transaction request from the first client, is further configured to:

determine a first request identifier associated with the first transaction request;

determine whether the first request identifier matches a second request identifier associated with a second transaction request pending in the apparatus; and responsive to a determination that the first request identifier matches the second request identifier associated with the second transaction request pending in the apparatus, append the first transaction request to a linked list that comprises the second transaction request; or responsive to a determination that the first request identifier does not match the second request identifier associated with the second transaction request pending in the apparatus, assign a value to an identifier flag for the first request identifier associated with the first transaction request.

7. The apparatus of claim 6, wherein the bridge is further configured to:

determine that a response sequence number is available for the first transaction request; and assign a first response sequence number to the first transaction request, the first response sequence number having a value that is larger than a value of a second response sequence number of the second transaction request.

8. The apparatus of claim 6, wherein the bridge is further configured to:

determine that a response sequence number is not available for the first transaction request; and stall execution of the first transaction request until the response sequence number is available.

9. The apparatus of claim 6, wherein the identifier flag comprises a one-bit flag for the first request identifier associated with the first transaction request.

10. A method comprising:

receiving, by a bridge, multiple transaction requests from a first client of one or more clients, the bridge operatively connected to the one or more clients and comprising a reorder buffer;

receiving, by the bridge, multiple transaction responses from a memory controller, each transaction response of the multiple transaction responses being associated with a corresponding transaction request of the multiple transaction requests, the multiple transaction responses to be returned, by the bridge, in-order to the first client, the memory controller operatively connected to one or more memories and configured to process transaction requests from the one or more clients to access data in the one or more memories;

in response to receiving each of the multiple transaction responses from the memory controller:

determining a response sequence number associated with the transaction response;

determining a response counter value, the response counter value having a value that incrementally increases and indicates a next transaction response to send to the first client; and responsive to the response sequence number being equal to the response counter value, transmitting data associated with the transaction response to the first client; or responsive to the response sequence number not being equal to the response counter value, storing data associated with the transaction response to the reorder buffer and set the response sequence number associated with the transaction response as available.

11. The method of claim 10, wherein: the transaction response comprises a first transaction response associated with the corresponding transaction request of the first client, and the method further comprises transmitting the data associated with first the transaction response to the first client.

12. The method of claim 11, further comprising:

determining whether a response sequence number of a second transaction response of the multiple transaction responses is next in an order in which the multiple transaction responses are to be returned; and responsive to determining that data of the second transaction response is available in the reorder buffer for sending to the first client:

reading data associated with the second transaction response from the reorder buffer;

transmitting the data associated with the second transaction response to the first client; and incrementing a response counter value by one effective to indicate a next transaction response to send to the first client.

13. The method claim 12, further comprising:

determining whether a response sequence number of another transaction response of the multiple transaction responses is equal to the response counter value; and responsive to determining that the other transaction response with the response sequence number equal to the response counter value is available for sending to the first client:

reading data associated with the other transaction response from the reorder buffer;

transmit the data associated with the other transaction response to the first client; and incrementing the response counter value by one.

14. The method of claim 10, wherein the response sequence numbers or the response counter value is associated with a request identifier of the multiple transaction responses that are to be returned by the bridge in-order.

15. The method of claim 10, wherein the multiple transaction requests received from the first client comprises a first transaction request and the method further comprises:

determining a first request identifier associated with the first transaction request;

determining whether the first request identifier matches a second request identifier associated with a second transaction request pending in the bridge; and responsive to determining that the first request identifier matches the second request identifier associated with the second transaction request pending in the bridge, appending the first transaction request to a linked list associated with the second request identifier; or responsive to determining that the first request identifier does not match the second request identifier associated with the second transaction request pending in the bridge, assigning a value to an identifier flag for the first request identifier associated with the first transaction request.

16. The method of claim 15, the method further comprising:

determining that a response sequence number is available for the first transaction request; and assigning a first response sequence number to the first transaction request, the first response sequence number having a value that is larger than a value of a second response sequence number of the second transaction request.

17. The method of claim 15, further comprising:

determining that a response sequence number is not available for the first transaction request; and stalling execution of the first transaction request until the response sequence number is available.

18. The method of claim 15, wherein the identifier flag comprises a one-bit flag for the first request identifier associated with the first transaction request.

19. The method of claim 10, further comprising:

determining whether the response sequence number associated with the transaction response is first in an order in which the multiple transaction responses are to be returned to the first client; and responsive to the response sequence number of the transaction response being first in the order in which the multiple transaction responses are to be returned, transmitting the data associated with the transaction response directly to the first client without storing the data in the reorder buffer; or responsive to the response sequence number of the transaction response not being first in the order in which the multiple transaction responses are to be returned, storing the data associated with the transaction response to the reorder buffer.

20. The apparatus of claim 1, wherein the bridge is further configured to:

determine whether the response sequence number associated with the transaction response is first in an order in which the multiple transaction responses are to be returned to the first client; and responsive to the response sequence number of the transaction response being first in the order, transmit the data associated with the transaction response directly to the first client without storing the data in the reorder buffer; or responsive to the response sequence number of the transaction response not being first in the order, store the data associated with the transaction response to the reorder buffer.

\* \* \* \* \*